3,340,253
PREPARATION OF CERTAIN BENZO-
DIAZEPINE COMPOUNDS
Earl Reeder, Nutley, Arthur Stempel, Teaneck, and Leo
Henryk Sternbach, Upper Montclair, N.J., assignors to
Hoffmann-La Roche Inc., Nutley, N.J., a corporation
of New Jersey
No Drawing. Filed Nov. 28, 1962, Ser. No. 240,750
8 Claims. (Cl. 260—239.3)

This application is a continuation-in-part of Ser. No. 178,551, filed Mar. 9, 1962, and now abandoned.

This invention relates to novel heterocyclic compounds and methods for their preparation. More particularly, the invention relates to 2-amino-5-phenyl-3H-1,4-benzodiazepines and 5 - phenyl - 3H - 1,4 - benzodiazepin-2(1H)-ones bearing a hydroxy group or substituted hydroxy group in the 3-position. Thus, the novel compounds of this invention are selected from the group consisting of those of the formulas (I)

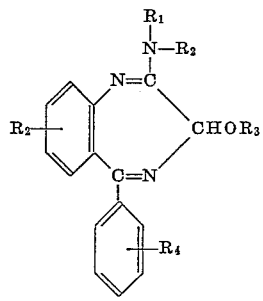

(II)

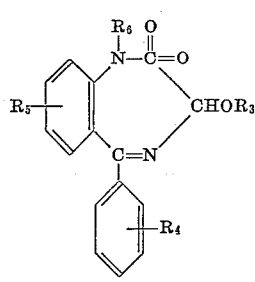

and their pharmaceutically acceptable salts, wherein $R_1$ is selected from the group consisting of hydrogen, lower alkanoyl, and ar-lower alkanoyl; $R_2$ is selected from the group consisting of hydrogen and lower alkyl; $R_3$ is selected from the group consisting of hydrogen, lower alkyl, lower alkanoyl, aroyl and ar-lower alkanoyl; $R_4$ is selected from the group consisting of hydrogen, halogen and trifluoromethyl; $R_5$ is selected from the group consisting of hydrogen, halogen, trifluoromethyl, nitro, lower alkylthio and lower alkyl; and $R_6$ is selected from the group consisting of hydrogen, lower alkyl and lower alkenyl.

The term lower alkyl includes both straight and branched chain groups such as methyl, ethyl, propyl, isopropyl, and the like. The term lower alkenyl refers to both straight and branched chain unsaturated hydrocarbon groups such as allyl and the like. The term lower alkanoyl refers to both straight and branch chain aliphatic carboxylic acid groups such as acetyl, propionyl, butyryl, isovaleroyl, and the like. Similarly the term aroyl refers to groups such as benzoyl and the like.

The compounds of Formulas I and II above form pharmaceutically acceptable acid addition salts with both inorganic and organic pharmaceutically acceptable acids, such as hydrochloric acid, hydrobromic acid, nitric acid, sulfuric acid, phosphoric acid, citric acid, formic acid, acetic acid, succinic acid, maleic acid, methanesulfonic acid, p-toluene-sulfonic acid, and the like. Such acid addition salts are also within the scope of the invention.

Compounds of Formula I above, wherein $R_3$ is lower alkanoyl, aroyl or ar-lower alkanoyl can be prepared by reacting a compound of the formula (III)

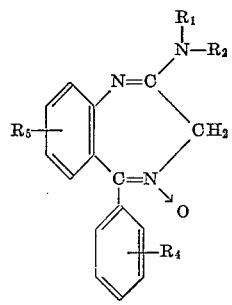

wherein $R_1$, $R_2$, $R_4$, and $R_5$ have the same meanings as above, with an acid anhydride, diacyl sulfide or acid halide. Via this procedure, the 4-position oxygen is split off and the 3-position carbon atom is concurrently acyloxylated. The acid anhydride, diacyl sulfide or acid halide (chlorides are preferred) used should, of course, be the one which would yield the desired lower alkanoyl, aroyl or ar-lower alkanoyl group ($R_3$ in the Formulas I and II above). Thus, if it is desired to prepare a compound wherein $R_3$ is acetyl, either acetic anhydride, diacetyl sulfide, or acetyl chloride can be used as the acylating agent. Thus, the acylating agents are selected from the group of lower alkanoyl anhydride, aroyl anhydride, ar-lower alkanoyl anhydride, di-lower alkanoyl sulfide, diaroyl sulfide, diar-lower alkanoyl sulfide, lower alkanoyl halide, aroyl halide and ar-lower alkanoyl halide. The reaction is conveniently either conducted in a conventional organic solvent such as dimethylformamide, pyridine, or the like; or, in the case wherein acid anhydride or diacyl sulfide is used as the acylating agent, said acid anhydride or diacyl sulfide can itself serve as the reaction medium. The reaction is, if desired, conducted at room temperature, but can be conducted at above or below room temperature.

In those cases wherein $R_1$ in Formula III is hydrogen, compounds of Formula I above, wherein $R_1$ and $R_3$ are the same acyl group, can be obtained. On the other hand, starting material compounds of Formula III above, wherein $R_1$ is already an acyl group can be reacted via the above procedure to yield compounds wherein $R_1$ remains unchanged and accordingly, $R_1$ and $R_3$ are the same or dissimilar acyl groups. Moreover, it has been found that by using dimethylformamide as the reaction medium, compounds of Formula III, wherein $R_1$ is hydrogen can be selectively acylated to yield compounds of Formula I wherein $R_1$ is hydrogen. Also, aroylation has been found to selectively occur at the 3-position and not to affect the 2-position nitrogen atom.

Compounds of Formula II above, wherein $R_3$ is lower alkanoyl, aroyl or ar-lower alkanoyl can similarly be prepared by reacting a compound of formula (IV)

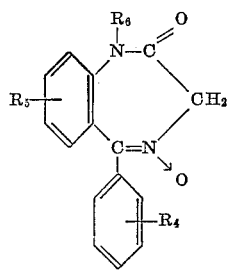

wherein $R_4$, $R_5$ and $R_6$ have the same meaning as above, with a compound selected from the group consisting of lower alkanoyl anhydride, aroyl anhydride, ar-lower alkanoyl anhydride, di-lower alkanoyl sulfide, diaroyl sulfide, diar-lower alkanoyl sulfide, lower alkanoyl halide, aroyl halide and ar-lower alkanoyl halide. As above, the reaction can be conducted in an organic solvent such as dimethylformamide, pyridine or the like, or in a case wherein an acid anhydride or diacyl sulfide is used as the acylating agent, said acid anhydride or diacyl sulfide can itself serve as the reaction medium. The reaction can be conducted at room temperature and, if desired, at above or below room temperature.

Compounds of Formula II wherein $R_6$ is lower alkyl or lower alkenyl can be prepared from corresponding compounds of Formula IV wherein $R_6$ is lower alkyl or lower alkenyl by the above described acylation processes. Alternatively, a lower alkyl or lower alkenyl group can be introduced in a compound of Formula II wherein $R_6$ is hydrogen by means known per se. Thus, a compound of Formula II wherein $R_6$ is hydrogen can be treated with sodium methoxide followed by treatment with a lower alkyl halide or lower alkenyl halide.

Compounds of Formulas I and II above, wherein $R_3$ is hydrogen, can be prepared by alkaline hydrolysis of compounds of Formulas I and II above wherein $R_3$ is lower alkanoyl, aroyl or ar-lower alkanoyl.

Compounds of Formulas I and II wherein $R_3$ is lower alkanoyl, aroyl or ar-lower alkanoyl can also be converted into corresponding compounds wherein $R_3$ is hydrogen by acids hydrolysis. Said acid hydrolysis can be advantageously effected by treating a compound of Formula I or II wherein $R_3$ is lower alkanoyl, aroyl, or ar-lower alkanoyl with an aqueous solution of a mineral acid such as hydrochloric acid, hydrobromic acid, sulfuric acid or the like or an organic acid as toluenesulfonic acid or the like. The treatment with acid is suitably effected at room temperature, though such is not critical and the hydrolysis can be conducted at higher or lower temperatures. However, of course, the temperature should not be so high as to cause decomposition of the desired end-product. It has been found that the acid hydrolysis is particularly advantageous, giving consistently high yields of compounds of Formulas I and II wherein $R_3$ is hydrogen. Said acid hydrolysis can suitably be effected in an aqueous medium containing an organic solvent such as dioxane, tetrahydrofuran or like organic solvents miscible with water.

Compounds of Formulas I and II wherein $R_3$ is lower alkyl can be prepared from corresponding compounds of Formula I and II wherein $R_3$ is other than lower alkyl. Suitably, such a compound of Formula I or II is reacted with a lower alkanol of the formula $R_3$—OH, wherein $R_3$ is lower alkyl, to yield corresponding compounds of Formula I or II wherein $R_3$ is lower alkyl. Suitably, this reaction is effected by treating an acid addition salt, for example, a hydrohalide such as the hydrochloride, of a compound of Formula I or II wherein $R_3$ is hydrogen, lower alkanoyl, aroyl or ar-lower alkanoyl, with a lower alkanol. Alternatively, said compound of Formula I or II in base form or in the form of an acid addition salt can be treated with lower alkanol in the presence of an acid such as a hydrohalic acid, for example, hydrochloric acid. The treatment with lower alkanol can be effected using the lower alkanol itself as the solvent, or in the presence of an inert organic solvent. Also, the treatment can be effected in the presence or absence of water. The treatment can be effected at room temperature or elevated temperatures, but the latter are preferred. Advantageously, the reaction with lower alkanol is effected at reflux, for example, in the case of the lower molecular weight lower alkanols, between about 60° C. and about 80° C.

The compounds of Formula I and II above are useful as sedatives, anticonvulsants and muscle relaxants. Said compounds or their pharmaceutically acceptable acid addition salts can be administered, with dosage adjusted to individual requirements, in conventional pharmaceutical dosage forms. For example, they can be administered internally, i.e. parenterally or enterally, in the form of tablets, suspensions, solutions, capsules, dragees, and the like.

The following examples are illustrative, but not limitative of the invention. All temperatures are in degrees centigrade.

*Example 1*

A solution of 31 g. of 7-chloro-2-methylamino-5-phenyl-3H-1,4-benzodiazepine 4-oxide in a mixture of 360 ml. of pyridine and 180 ml. of acetic anhydride was heated to 50° for 20 minutes, then left at room temperature for four days. The solution was concentrated in vacuo to a small volume, and the residue was treated with ether and petroleum ether, which caused the precipitation of crystals. The first fraction of crystals (19.1 g.) consisted of almost pure 7-chloro-2-(N-methylacetamido)-5-phenyl-3H-1,4-benzodiazepine 4-oxide. The second fraction obtained after the addition of more petroleum ether weighed 11.8 g. and melted below 140°. After recrystallization of this fraction from ether or a mixture of methylene chloride, ether and petroleum ether, 7-chloro-2-(N-methylacetamido)-3-acetoxy-5-phenyl-3H-1,4-benzodiazepine was obtained. The product is dimorphic and forms colorless prisms melting at 145–146° or at 159–160°.

*Example 2*

A solution of 10 g. of 7-chloro-2-(N-methylacetamido)-5-phenyl-3H-1,4-benzodiazepine 4-oxide in 25 ml. of acetic anhydride was heated for 10 minutes to 80°. The solution was concentrated in vacuo and the residue recrystallized from a mixture of acetone and petroleum ether. First 2.6 g. of unreacted starting material crystallized out and was removed. Then more petroleum ether was added, yielding crystals of 7-chloro-2-(N-methylacetamido)-3-acetoxy-5-phenyl-3H-1,4-benzodiazepine. The product was crystallized from ether or a mixture of methylene chloride, ether and petroleum ether. It is dimorphic and forms colorless prisms melting at 145–146° or at 159–160°.

*Analysis.*—Calcd. for $C_{20}H_{18}N_3O_3Cl$: C, 62.58; H, 4.73; O, 12.51; acetyl, 22.43. Found: C, 62.56; H, 4.47; O, 12.91; acetyl, 22.81.

*Example 3*

To a solution of 64 g. of 7-chloro-2-methylamino-5-phenyl-3H-1,4-benzodiazepine 4-oxide in 600 ml. of dimethylformamide, 25.2 ml. of acetyl chloride was added with outside cooling. Crystals of 7-chloro-2-methylamino-3-acetoxy-5-phenyl-3H-1,4-benzodiazepine hydrochloride started to precipitate after a short time and were filtered off after about 1 hour. After recrystallization from a mixture of ethanol and petroleum ether the product formed colorless needles melting at 212–213°.

*Analysis.*—Calcd. for $C_{18}H_{16}N_3O_2Cl$: C, 57.15; H, 4.53. Found: C, 56.99; H, 4.80.

The above described 7-chloro-2-methylamino-3-acetoxy-5-phenyl-3H-1,4-benzodiazepine hydrochloride was treated with an excess of ice cold dilute sodium hydroxide, and the liberated base was extracted with methylene chloride. The methylene chloride layer was separated, dried, and concentrated in vacuo and the residue was crystallized from a mixture of methylene chloride and ether to yield colorless prisms of 7-chloro-2-methylamino-3-acetoxy-5-phenyl-3H-1,4-benzodiazepine melting at 202–203°.

*Analysis.*—Calcd. for $C_{18}H_{16}N_3O_2Cl$: C, 63.25; H, 4.72; N, 12.30; acetyl, 12.6. Found: C, 63.12; H, 4.77; N, 12.46, 12.47; acetyl, 12.94.

*Example 4*

A solution of 3.8 g. of 7-chloro-2-(N-methylacetamido)-3-acetoxy-5-phenyl-3H-1,4-benzodiazepine in 50 ml. of dioxane was treated with 10 ml. of 1 N sodium hydroxide. After 1½ hours standing at room temperature, the mixture was concentrated in vacuo to a small volume and diluted with water and ether. The ether layer was separated, dried, concentrated to a small volume, and the precipitated crystals were filtered off. Thus, colorless prisms were obtained which after recrystallization from acetone were identical with an original sample of 7-chloro - 2 - methylamino - 3 - acetoxy - 5 - phenyl-3H-1,4-benzodiazepine.

*Example 5*

A solution of 1 g. of 7-chloro-2-methylamino-5-phenyl-3H-1,4-benzodiazepine-3-ol in a mixture of 10 ml. of pyridine and 5 ml. of acetic anhydride was left at room temperature for 16 hours, concentrated in vacuo to dryness and the residue recrystallized from a mixture of acetone and petroleum ether yielding colorless prisms of 7 - chloro - 2 - methylamino - 3 - acetoxy-5-phenyl-3H-1,4-benzodiazepine.

*Example 6*

A solution of 3.4 g. of 7-chloro-2-methylamino-3-acetoxy-5-phenyl-3H-1,4-benzodiazepine in a mixture of 50 ml. of dioxane and 10 ml. of 1 N sodium hydroxide was stirred at room temperature for 4 hours and then concentrated in vacuo to a small volume. Water was added and the reaction product was extracted with methylene chloride. The organic layer was dried, concentrated in vacuo and the residual oil was crystallized from ether. After recrystallization from a mixture of methylene chloride and petroleum ether, colorless needles of 7-chloro-2-methylamino-5-phenyl-3H-1,4-benzodiazepin-3-ol melting at 184–186° were obtained.

*Analysis.*—Calcd. for $C_{16}H_{14}ClN_3O$: C, 64.11; H, 4.71; N, 14.02. Found: C, 64.11; H, 4.98; N, 13.58.

*Example 7*

To a solution of 1.9 g. of 7-chloro-2-(N-methylacetamido) - 3 - acetoxy-5-phenyl-3H-1,4-benzodiazepine in 50 ml. of dioxane was added 10 ml. of 1 N sodium hydroxide. The mixture was stirred at room temperature for 20 hours and then concentrated in vacuo. The residue was dissolved in methylene chloride, washed with water, the organic layer was separated, dried, and concentrated in vacuo. The residue was crystallized from methylene chloride yielding colorless needles of 7-chloro-2-methylamino-5-phenyl-3H-1,4-benzodiazepin-3-ol.

*Example 8*

To a solution of 12 g. of 7-chloro-2-methylamino-5-phenyl-3H-1,4-benzodiazepine 4-oxide in 100 ml. of dimethylformamide was added 5.5 g. of propionyl chloride. The solution was cooled, left at room temperature for 1 hour and then diluted with ice water and dilute sodium hydroxide. The mixture was then extraced with methylene chloride, the organic layer washed with dilute hydrochloric acid and water, dried and concentrated in vacuo. The residual oil was crystallized from ether or from a mixture of ether and petroleum ether yielding colorless prisms of 3-propionyloxy - 7 - chloro - 2 - methylamino-5-phenyl-3H-1,4-benzodiazepine melting at 197–198°.

*Analysis.*—Calcd. for $C_{18}H_{13}ClN_3O_2$: C, 64.12; H, 5.10; N, 11.81. Found: C, 64.15; H, 5.38; N, 11.70, 11.71.

*Example 9*

To a solution of 12 g. of 7-chloro-2-methylamino-5-phenyl-3H-1,4-benzodiazepine 4-oxide in 100 ml. of dimethylformamide was added 6 ml. of butryl chloride. The solution was left at room temperature for 16 hours, then diluted with ice water and extracted with methylene chloride. The organic layer was washed with dilute sodium hydroxide and water, dried and concentrated in vacuo. To the resiue, ether was added yielding colorless crystals of 3 - butyryloxy - 7 - chloro - 2 - methylamino - 5 - phenyl-3H-1,4-benzodiazepine melting at 174–175°.

*Example 10*

To a solution of 6 g. of 7-chloro-2-methylamino-5-phenyl-3H-1,4-benzodiazepine 4-oxide hydrochloride in 25 ml. of pyridine, 2.7 g. of isovaleryl chloride was added. The mixture was left at room temperature for 16 hours and then concentrated in vacuo. The residue was dissolved in methylene chloride, washed with dilute ice cold hydrochloric acid, then sodium carbonate solution and water. The organic layer was separated, dried and concentrated in vacuo. The residue was crystallized from a mixture of ether and petroleum ether yielding colorless prisms of 3-isovaleryloxy - 7 - chloro - 2 - methylamino - 5 - phenyl-3H-1,4-benzodiazepine melting at 132–133°.

*Analysis.*—Calcd. for $C_{21}H_{22}ClN_3O_2$: C, 65.70; H, 5.78. Found: C, 66.50; H, 5.91.

*Example 11*

To a solution of 7-chloro-2-methylamino-5-phenyl-3H-1,4-benzodiazepine 4-oxide in 100 ml. of dimethylformamide was added 5 ml. of benzoyl chloride. The mixture was left at room temperaure for three days, then ice water was added and the reaction product extracted with methylene chloride. The organic solution was separated, dried and concentrated in vacuo. To the residual oil, ether was added an the precipitated crystals of 3-benzoyloxy - 7 - chloro - 2 - methylamino - 5 - phenyl - 3H - 1,4-benzodiazepine were filtered off. After recrystallization from acetone the product formed prisms melting at 215–216°.

The same product was obtained by benzoylation of 7-chloro-2-methylamino-5-phenyl-3H-1,4-benzodiazepine 4-oxide in pyridine solution.

*Example 12*

A suspension of 25 g. of 7-chloro-5-phenyl-3H-1,4-benzodiazepin-2(1H)-one 4-oxide in 100 ml. of acetic anhydride was heated to 80° for 1 hour. On cooling a precipitate was obtained. The precipitate was filtered off, washed with ether and petroleum ether, and recrystallized from a mixture of methylene chloride and petroleum ether yielding colorless prisms of 3-acetoxy-7-chloro-5-phenyl-3H-1,4-benzodiazepin-2(1H)-one melting at 246–247°.

*Analysis.*—Calcd. for $C_{17}H_{13}N_2O_3Cl$: C, 62.11; H, 3.99; N, 8.52. Found: C, 61.90; H, 4.23; N, 8.62.

*Example 13*

A suspension of 32 g. of 3-acetoxy-7-chloro-5-phenyl-3H-1,4-benzodiazepin-2(1H)-one in a mixture of 700 ml. of ethanol and 200 ml. of 1 N sodium hydroxide was stirred at room temperature for 10 minutes and then heated for 10 minutes to 40°. The mixture was then diluted with 200 ml. of water, stirred at room temperature for an additional 45 minutes and then cooled to 25°. 100 ml. of 1 N hydrochloric acid was added and the precipitated crystals of 7-chloro-3-hydroxy-5-phenyl-3H-1,4-benzodiazepin-2(1H)-one were filtered off. After recrystallization from acetone, colorless plates were obtained melting at 205–206°.

*Analysis.*—Calcd. for $C_{15}H_{11}N_2O_2Cl$: C, 62.83; H, 3.86. Found: C, 63.19; H, 3.79.

*Example 14*

To a solution of 10 millimols of 2-methylamino-5-phenyl-7-trifluoromethyl-3H-1,4-benzodiazepine 4-oxide in 20 ml. of dimethylformamide, 15 millimols of acetyl chloride were added while stirring. The solution was permitted to stand for one hour at room temperature. At the end of this period, the solvent was distilled off at below 35° in vacuo. The residue was then refluxed with acetone, chilled and filtered to give 3-acetoxy-2-methylamino-5-phenyl-7-trifluoromethyl - 3H-1,4 - benzodiazepine hydrochloride which upon two recrystallizations from acetonitrile formed colorless needles melting at 206–207°.

*Analysis.*—Calcd. for $C_{19}H_{16}F_3O_2HCl$: C, 55.41; H, 4.16; N, 10.20. Found: C, 55.67; H, 4.36; N, 10.53.

700 mg. of 3-acetoxy-2-methylamino-5-phenyl-7-trifluoromethyl-3H-1,4-benzodiazepine hydrochloride was partitioned between chloroform and dilute sodium carbonate. The organic layer was washed with water, dried over sodium sulfate, filtered and concentrated to dryness in vacuo. The residue was crystallized from a mixture of benzene and hexane yielding 3-acetoxy-2-methylamino-5-phenyl-7-trifluoromethyl-3H-1,4 - benzodiazepine which crystallized as heavy colorless prisms; M.P. 211–212°. Further recrystallization did not alter the melting point.

*Analysis.*—Calcd. for $C_{19}H_{16}F_3N_3O_2$: N, 11.20. Found: N, 11.04.

The above-mentioned 2 - methylamino-5-phenyl-7-trifluoromethyl-3H-1,4-benzodiazepine 4-oxide, its preparation and intermediates therefor, are not a part of this invention, but such as disclosed hereinbelow in order that the present disclosure may be complete.

80 g. of sodium nitrite were added slowly with stirring to 460 ml. of concentrated sulfuric acid. After heating to 70°, a clear solution was obtained. This solution was cooled and 200 g. of 2-chloro-5-trifluoromethylaniline were slowly added at a temperature between 10 and 20°. The reaction mixture was stirred for one hour at 20° and then poured onto a mixture of 200 g. of sodium chloride and 1.6 kg. of ice. Excess sodium chloride was filtered off. A solution of 280 g. of zinc chloride in 300 ml. of water was added to the filtrate whereupon a zinc chloride double salt of the corresponding diazonium compound precipitated. After standing overnight at 0°, the double salt was filtered off and washed with a cold saturated salt solution.

To a solution of 120 g. of sodium cyanide and 72 g. of cuprous cyanide in 300 ml. of water were added with stirring and cooling with ice, 291 g. of the wet zinc chloride double salt. After the addition of 24 g. of sodium carbonate, the mixture was first stirred for one hour at 20° and then at 70° for an additional ½ hour. The reaction mixture was cooled and extracted with ether to obtain crude 2-chloro-5-trifluoromethylbenzonitrile. The product was purified by steam distillation and crystallization of the organic part of the distillate from hexane to give the pure compound, M.P. 39–40°.

To a solution of phenyl magnesium bromide, prepared from 9.5 g. of magnesium, 58.5 g. of bromobenzene and 500 ml. of anhydrous ether, was added with stirring a solution of 39 g. of 2-chloro-5-trifluoromethylbenzonitrile in 200 ml. of benzene. 400 ml. of solvent were distilled off and the reaction mixture was then refluxed for 16 hours. The Grignard complex was decomposed with 40 g. of ammonium chloride and 200 g. of ice. The mixture was then extracted with benzene. 2-chloro-5-trifluoromethylbenzophenone imine hydrochloride was precipitated from the benzene solution by the addition of 40 ml. of concentrated hydrochloric acid. The product was filtered off, washed with benzene and dried in vacuo, M.P. 248–251°, and upon further purification melted at 250–262°.

60 g. of 2-chloro-5-trifluoromethylbenzophenone imine hydrochloride were refluxed overnight with a mixture of 300 ml. of toluene and 300 ml. of 25% sulfuric acid while stirring. The toluene layer was separated, washed with water, dried, concentrated in vacuo and the residue crystallized from hexane to yield pure 2-chloro-5-trifluoromethylbenzophenone, M.P. 39–40° (corr.).

50 g. of 2-chloro-5-trifluoromethylbenzophenone and 500 ml. of concentrated aqueous ammonia were reacted in a closed vessel for 10 hours at 140° in the presence of 10 g. of cuprous chloride catalyst. The reaction product was extracted with ether. The ether extract was concentrated in vacuo, the residue dissolved in hexane and purified by chromatography using a 10 fold amount of neutral alumina (Brockmann acivity state II). Elution with a hexane-ether mixture (1:1) and evaporation of the solvent gave 2 - amino - 5 - trifluoromethylbenzophenone which was recrystallized from hexane to give yellow crystals, M.P. 81–82° (corr.).

13.3 g. of 2-amino-5-trifluoromethylbenzophenone in 60 ml. of ethanol were refluxed for 24 hours with 6 g. of hydroxylamine hydrochloride. The reaction mixture was adjusted to about pH 6 by the addition of a solution of 12 g. of sodium acetate in 100 ml. of water. The mixture was then extracted with ether to yield an oil which, after repeated crystallization from a mixture of ether and hexane, gave 2-amino-5-trifluoromethylbenzophenone oxime melting at 175–177°, which upon further crystallization melted at 182–183° (corr.).

2.8 g. of the 2-amino-5-trifluoromethylbenzophenone oxime obtained above were dissolved in 15 ml. of acetic acid and, after addition of 1.5 ml. of chloroacetyl chloride, kept for one hour at 20°, then for two hours at 70°. The mixture was diluted with ether and washed with water. The ether solution was concentrated in vacuo and gave a solid residue which was crystallized from methylene chloride-ether to yield pure, yellow 2-chloromethyl-4-phenyl-6-trifluoromethylquinazoline 3-oxide, M.P. 149–150°.

500 mg. of 2-chloromethyl-4-phenyl-6-trifluoromethylquinazoline 3-oxide were reacted for 5 hours at 25° with 10 ml. of a 40% solution of methylamine in methanol. The reaction mixture was diluted with water, then extracted with ether. The ether solution was concentrated in vacuo and the residual crude, 7-trifluoromethyl-2-methylamino - 5 - phenyl-3H-1,4-benzodiazepine 4-oxide, was purified by crystallization from ether-hexane to yield colorless crystals melting at 257–258°, which upon recrystallization melted at 264–265°.

*Example 15*

1.9 g. of 5-phenyl-7-trifluoromethyl-3H-1,4-benzodiazepin-2(1H)-one 4-oxide was heated with 10 ml. of acetic anhydride for one hour on a steam bath (85–90°). The clear solution changed in color from pink to yellow. After standing one further hour, the reaction mixture was concentrated in vacuo to dryness and the residue crystallized from a mixture of benzene and hexane yielding 3-acetoxy - 5 - phenyl-7-trifluoromethyl-3H-1,4-benzodiazepin-2(1H)-one which upon two recrystallizations from a mixture of benzene and hexane formed small colorless plates melting at 230–231°.

*Analysis.*—Calcd. for $C_{18}H_{13}F_3N_2O_3$: N, 7.73. Found: N, 7.65.

The above-mentioned 5 - phenyl-7-trifluoromethyl-3H-1,4-benzodiazepin-2(1H)-one 4-oxide, its preparation and intermediates therefor, are not a part of this invention, but such are disclosed hereinbelow in order that the present disclosure may be complete.

538 mg. of 2-chloromethyl-4-phenyl-6-trifluoromethylquinazoline 3-oxide were dissolved in 20 ml. of ethanol and, after the addition of 5 ml. of 3 N sodium hydroxide, the solution was kept for 4 hours at 25°. After acidification with 6 ml. of 3 N hydrochloric acid, the reaction product was extracted with ether. The ether solution was concentrated in vacuo and the residue crystallized from benzene to yield purified 7-trifluoromethyl-5-phenyl-3H-1,4 - benzodiazepin-2(1H)-one 4-oxide, M.P. 211–212°, which upon further crystallization melted at 217–218° (corr.).

*Example 16*

To a solution of 100 mg. of 2-methylamino-7-nitro-5-phenyl-3H-1,4-benzodiazepine 4-oxide in 5 ml. of dimethylformamide, 0.5 cc. of acetyl chloride was added. After stirring for one hour at room temperature, the reaction mixture was concentrated to dryness in vacuo. The residue was dissolved in acetone and precipitated with anhydrous ether to give 85 mg. of crude 3-acetoxy-2-methylamino-7-nitro-5-phenyl-3H-1,4 - benzodiazepine hydrochloride. This was then partitioned between chloroform and dilute sodium hydroxide. The organic layer was washed twice with water, dried over sodium sulfate, filtered, and concentrated to dryness in vacuo. The residue was crystallized from a mixture of benzene and hexane to give 3-acetoxy-2-methylamino-7-nitro-5-phenyl-3H-1,4-benzodiazepine, M.P. 210–212°, which crystallized as clusters of yellow rectangular plates.

The above-mentioned 7-nitro-2-methylamino-5-phenyl-3H-1,4-benzodiazepine 4-oxide, its preparation and intermediates therefor, are not a part of this invention, but such are disclosed hereinbelow in order that the present disclosure may be complete.

A mixture of 72 g. of 2-amino-5-nitrobenzophenone, 34 g. of hydroxylamine hydrochloride, 90 g. of powdered potassium hydroxide, 500 cc. of alcohol and 25 cc. of water was refluxed on a steambath with stirring for 15 minutes. It was then cooled to room temperature and poured into a solution of 160 cc. of concentrated hydrogen chloride in 1000 cc. of water. The suspension of the precipitated crude product was cooled in ice and then filtered off, washed acid-free with ice water, and sucked dry, and crystallized from ethanol in needles, giving 2-amino-5-nitrobenzophenone oxime, M.P.=203–205°.

To a suspension of 10 g. of 2-amino-5-nitrobenzophenone oxime in 100 cc. of acetic acid, warmed to 50–60°, 6 cc. of chloracetyl chloride was added in small portions, with stirring. The resulting brown solution was stirred at 50–60° for 3 hours and then allowed to stand at room temperature overnight. The reaction mixture was then saturated with hydrogen chloride and concentrated in vacuo. The residue was dissolved in 200 cc. of warm methylene chloride and was then cooled to 0°. 50 g. of crushed ice was added to the reaction mixture, then 30 cc. of I N sodium hydroxide dropwise until a pH of 8–9 was reached. The mixture wast transferred to a separatory funnel and 150 cc. water were added. The organic phase was separated and dried over sodium sulfate. The methylene chloride solution was treated with activated charcoal, filtered, and evaporated to dryness in vacuo to give a yellow crystalline residue. The crude product was purified by refluxing in a mixture of 200 cc. of acetone and 100 cc. of methylene chloride with 15 g. of activated charcoal. 2-chloro-methyl-4-phenyl-6-nitroquinazoline 3-oxide crystallized in yellow prisms on cooling of the filtered mixture. M.P.=205–207°.

6.0 g. of 2-chloromethyl-4-phenyl-6-nitroquinazoline 3-oxide was added in portions to 150 cc. of a 25% solution of methylamine in methanol at 5° with cooling and stirring. After a few minutes, a yellow crystalline substance started to separate. The reaction mixture was stirred at room temperature for 24 hours then allowed to stand for another 24 hours. The yellow product was filtered off, washed with a little methanol, sucked dry, and crystallized in needles from ether-methanol giving 7-nitro-2-methylamino-5-phenyl - 3H - 1,4 - benzodiazepine 4-oxide, which melted at 260–261° (dec.).

*Example 17*

A suspension of 39.5 g. 1-methyl-7-nitro-5-phenyl-1,3-dihydro-2H-1,4-benzodiazepin-2-one 4-oxide in 400 ml. of acetic anhydride was heated for 1 hr. on a steam bath. The starting material dissolved on heating and the product, 3-acetoxy-1,3-dihydro - 1 - methyl-7-nitro-5-phenyl-2H-1,4-benzodiazepine-2-one, crystallized on cooling. Recrystallization from a mixture of acetone and hexane or tetrahydrofuran and hexane gave colorless clusters of needles melting at 248–249°.

The above-mentioned 1-methyl-7-nitro - 5 - phenyl-1,3-dihydro-2H-1,4-benzodiazepine-2-one 4-oxide and its preparation are not a part of this invention, but such are disclosed hereinbelow in order that this disclosure may be complete.

6.3 g. (0.02 mol.) of 2-chloromethyl-4-phenyl-6-nitroquinazoline 3-oxide was suspended in a mixture of 50 cc. ethanol and 20 cc. acetone. 24 cc. of normal NaOH was added dropwise, the reaction mixture turning a dark brown color (pH=9–10). The mixture was warmed to 40°, then stirred at room temperature overnight. The reaction mixture was then adjusted to pH 5 with dilute hydrochloric acid and concentrated in vacuo to dryness. The residue was refluxed with a mixture of 125 cc. ethanol and 30 cc. acetone. After filtration and concentration to 50 cc. a small amount of starting material was filtered off and 7-nitro-5-phenyl - 3H-1,4 - benzodiazepin-2(1H)-one 4-oxide was obtained by precipitation with petroleum ether. The pure product crystallized in yellow prisms from ethanol-petroleum ether and melted at 218–220° (dec.).

To a suspension of 10.0 g. of 7-nitro-5-phenyl-1,3-dihydro-2H-1,4-benzodiazepine-2-one 4-oxide in 150 ml. of methanol, 1.8 g. of sodium methoxide was added. The dark reddish brown solution formed was then concentrated to dryness in vacuo. The residue was dissolved in 150 ml. of dimethylformamide and then appeared to crystallize. To the stirred suspension, 6.3 ml. of methyl iodide was added slowly. The temperature rose about 10°. After stirring for 1½ hrs. at room temperature, the solvent was distilled off in vacuo keeping the bath temperature below 40°. The residue crystallized when stirred with warm water to give crude 1-methyl-7-nitro-5-phenyl-1,3-diyhdro-2H-1,4-benzodiazepine-2-one 4-oxide. Recrystallization from a mixture of acetone and hexane gave a purified product (yellow plates) melting at 219–221° (dec).

*Example 18*

To a solution of 3.5 g. of 3-acetoxy-1,3-dihydro-1-methyl-7-nitro-5-phenyl-2H-1,4-benzodiazepine-2-one in 100 ml. of tetrahydrofuran, 10 ml. of 1 N hydrochloric acid was added. After standing overnight at room temperature, the solvent was distilled off in vacuo and the residue stirred with water. A thick oil separated and was extracted with chloroform. After drying over sodium sulfate, the solvent was distilled in vacuo and the residue crystallized from ethanol to give 1,3-dihydro-3-hydroxy-1-methyl-7-nitro-5-phenyl-2H-1,4-benzodiazepine-2-one. Recrystallization from ethanol gave yellow prisms melting at 202–203°.

*Example 19*

To a solution of 10.0 g. of 3-acetoxy-1,3-dihydro-1-methyl-7-nitro-5-phenyl-2H-1,4-benzodiazepine-2-one in 300 ml. of tetrahydrofuran, 28 ml. of 2 N hydrochloric acid was added. After standing overnight at room temperature, the solvent was distilled off in vacuo and the residue partitioned between chloroform and water. The organic layer was dried over sodium sulfate, filtered, and solvent distilled in vacuo. The residue, on warming with 50 ml. of ethanol, crystallized. After chilling, 1,3-dihydro-3 - hydroxy - 1 - methyl-7-nitro-5-phenyl-2H-1,4-benzodiazepine-2-one was filtered off. Recrystallization from ethanol gave large yellow prisms melting at 200–202°.

*Example 20*

A solution of 2.3 g. of 7-chloro-1,3-dihydro-3-hydroxy-5-phenyl-2H-1,4-benzodiazepin-2-one in 75 ml. of warm dioxane was cooled in an ice bath and 1 ml. concentrated hydrochloric acid was added. The pure crystalline hydrochloride of 7-chloro-1,3-dihydro-3-hydroxy-5-phenyl-2H-1,4-benzodiazepin-2-one precipitated out and was separated by filtration. The melting point was 161–3°, with decomposition, and varied with the rate of heating.

*Example 21*

A solution of 2.4 g. of 7-chloro-1,3-dihydro-3-hydroxy-5-phenyl-2H-1,4-benzodiazepin-2-one hydrochloride in 100 ml. of ethanol was refluxed for 1 hour. The reaction mixture was then concentrated in vacuo to dryness and the residue was dissolved in methylene chloride and washed with water. The organic layer was separated, dried and concentrated in vacuo. The residue was crystallized from a mixture of methylene chloride and petroleum ether and yielded 7-chloro-3-ethoxy-1,3-dihydro-5-phenyl-2H-1,4-benzodiazepin-2-one as reaction product. On recrystallization from methylene chloride the purified product formed colorless plates melting at 225–6°.

*Example 22*

A solution of 3.7 g. of 3-acetoxy-7-chloro-5-phenyl-1,3-dihydro-2H-1,4-benzodiazepin-2-one in 300 ml. of boiling ethanol was cooled to 25° and treated with 10 ml. of 1 N hydrochloric acid. The reaction mixture was stirred at room temperature for 20 hours and the crystalline reaction product, 7-chloro-3-ethoxy-1,3-dihydro-5-phenyl-2H-1,4-benzodiazepin-2-one, was separated by filtration. By concentrating the filtrate in vacuo to a smaller volume a second crop of the product was obtained.

*Example 23*

A solution of 2 g. of 7-chloro-5-(2-chlorophenyl)-1,3-dihydro-1-methyl-2H-1,4-benzodiazepin-2-one 4-oxide in 50 ml. of acetic anhydride was heated on a steam bath for 3 hours. The acetic anhydride was then removed in vacuo. The residue crystallized on trituration with ether and was recrystallized from a mixture of dichloromethane and ether to yield 3-acetoxy-7-chloro-5-(2-chlorophenyl)-1,3-dihydro-1-methyl-2H-1,4-benzodiazepin-2-one as white prisms melting at 219–221°.

Using diacetyl sulfide instead of acetic anhydride in the procedure described above gave white prisms of 3-acetoxy-7-chloro-5-(2-chlorophenyl)-1,3-dihydro-1-methyl-2H-1,4-benzodiazepin-2-one identical with the above-obtained product by the usual criteria (IR-spectrum, mixed melting point).

The above-mentioned 7-chloro-5-(2-chlorophenyl)-1,3-dihydro-1-methyl-2H-1,4-benzodiazepin-2-one 4-oxide and its preparation are not a part of this invention, but such are disclosed hereinbelow in order that this disclosure may be complete.

6-chloro-2-chloromethyl-4-(2-chlorophenyl)-quinazoline 4-oxide (5 g.) was dissolved in alcohol (50 ml.) and 37 ml. NaOH (1 N) added. The clear solution was kept standing overnight, the main amount of alcohol was removed in vacuo and the solution was extracted with ether and $CH_2Cl_2$. The water phase was acidified with HCl and extracted with ether and $CH_2Cl_2$. The organic phase yielded on evaporation crystals of 7-chloro-5-(2-chlorophenyl)-3H-1,4-benzodiazepine-2(1H)-one-4-oxide which after recrystallization from benzene-ether melted at 248–249° (dec.).

To a solution of 50 mg. of 7-chloro-5-(2-chlorophenyl)-1,3-dihydro-2H-1,4-benzodiazepin-2-one 4-oxide in 2 ml. of dimethyl-formamide was added 0.38 ml. of a 0.43 N solution of sodium methoxide in methanol. After addition of 0.02 ml. of methyl iodide the mixture was diluted with water and extracted with dichloromethane. The dichloromethane solution was washed with water, dried over sodium sulfate and evaporated on a steam bath. The residue crystallized on addition of methanol. Recrystallization from a mixture of dichloromethane and methanol gave 7-chloro-5-(2-chlorophenyl)-1,3-dihydro-1-methyl-2H-1,4-benzodiazepin-2-one 4-oxide as white prisms melting at 220–222°.

*Example 24*

To a stirred suspension of 3 g. of 3-acetoxy-7-chloro-5-(2-chlorophenyl)-1,3-dihydro-1-methyl-2H-1,4-benzodiazepin-2-one in 40 ml. of methanol was added in the course of 30 minutes, 3.75 ml. of 2 N aqueous sodium hydroxide. The mixture was then stirred for 30 minutes. The crystalline precipitate which had formed was collected on a filter and recrystallized from a mixture of dichloromethane and ether. The product, 7-chloro-5-(2-chlorophenyl)-1,3-dihydro-3-hydroxy-1-methyl-2H-1,4-benzodiazepin-2-one, formed white prisms melting at 207–209°.

*Example 25*

To a solution of 2.0 g. of 3-acetoxy-1,3-dihydro-5-phenyl-7-trifluoromethyl-2H-1,4-benzodiazepin-2-one in 50 ml. of ethanol at 50°, 11 ml. of 1 N sodium hydroxide was added. The mixture was stirred for 20 minutes at 40–50°. After several minutes a crystalline material separated. The reaction mixture was then cooled to room temperature. On addition of 50 ml. of water, a clear solution resulted. To this solution, 11 ml. of 1 N hydrochloric acid was added. On chilling, 1,3-dihydro-3-hydroxy-5-phenyl-7-trifluoromethyl-2H-1,4,-benzodiazepin-2-one melting at 190–192° (dec.) crystallized. Recrystallization from ethanol gave clusters of colorless needles of unchanged melting point.

*Example 26*

A suspension of 26.5 g. of 1,3-dihydro-7-nitro-5-phenyl-2H-1,4-benzodiazepin-2-one 4-oxide in 200 ml. of acetic anhydride was heated for 1 hr. on a steam bath. After 15 minutes all of the starting material had dissolved and the product began to crystallize. After cooling, the crystalline material was filtered and washed with hexane to give 3-actoxy-1,3-dihydro-7-nitro-5-phenyl-2H-1,4-benzodiazepin-2-one melting at 267–268°. Recrystallization from a mixture of tetrahydrofuran and hexane did not alter the melting point.

*Example 27*

To a solution of 6.9 g. of 3-acetoxy-2-methylamino-5-pheny-7-trifluoromethyl-3H-1,4-benzodiazepine hydrochloride in 150 ml. of ethanol at 50°, 25 ml. of 2 N sodium hydroxide was added and the mixture stirred for 20 minutes at 40–50°. After cooling and dilution with 150 ml. of water, 16.7 ml. of 1 N hydrochloric acid was added. The solution was then extracted with chloroform. The chloroform layer was washed with water, dried over sodium sulfate, filtered and concentrated to dryness in vacuo. On warming the residue with hexane, the product 2-methylamino-5-phenyl-7-trifluoromethyl-3H-1,4-benzodiazepin-3-ol crystallized; M.P. 177–178° (dec.). Recrystallization from a mixture of benzene and hexane gave clusters of colorless rods of unchanged melting point.

*Example 28*

To a solution of 12.2 g. of 3-acetoxy-1,3-dihydro-7-nitro-5-phenyl-2H-1,4-benzodiazepin-2-one in 500 ml. of tetrahydrofuran at 50°, 72 ml. of 1 N sodium hydroxide was added. After stirring for 20 minutes at 40–50°, the mixture was cooled to room temperature and 72 ml. of 1 N hydrochloric acid was added. The solution was then concentrated in vacuo to about 100 ml. On addition of 500 ml. of water, 1,3-dihydro-3-hydroxy-7-nitro-5-phenyl-2H-1,4-benzodiazepin-2-one crystallized. Recrystallization from a mixture of tetrahydrofuran and hexane gave colorless plates of purified product melting at 220–221° (dec.).

*Example 29*

A suspension of 8.0 g. of 1,3-dihydro-7-methylthio-5-phenyl-2H-1,4-benzodiazepin-2-one 4-oxide in 80 ml. of acetic anhydride was heated for 1 hr. on a steam bath. The starting material appeared to dissolve and the product crystallized. The solid was filtered off, after cooling, and washed with hexane to give 3-acetoxy-1,3-dihydro-7-methylthio-5-phenyl-2H-1,4-benzodiazepin-2-one. Recrystallization from a mixture of chloroform and hexane gave colorless prisms melting at 253–254° (dec.).

The above-mentioned 1,3-dihydro-7-methylthio-5-phenyl-2H-1,4-benzodiazepin-2-one 4 oxide and its preparation are not a part of this invention, but such are disclosed hereinbelow in order that this disclosure may be complete.

137 g. (1 mole) of anthranilic acid were dissolved in 250 cc. dimethylformamide. The solution was cooled to 0° and 85 cc. (155 g.=1.3 mole) of thionyl chloride were added dropwise, keeping the temperature of the reaction mixture below 40°. After allowing the mixture to cool to room temperature, 750 cc. of acetone were added. It was then cooled to 0°. The white 2-dimethylformamidinoanthranilic acid hydrochloride which separated was filtered off on a fritted glass funnel, washed with 300 cc. cold acetone and sucked dry, M.P. 215–217°.

115 g. (0.5 mole) of 2-dimethylformamidinoanthranilic acid hydrochloride were suspended in 1500 cc. of thiophene-free benzene. 119 g. phosphorus pentachloride were added and the mixture was refluxed on the steam bath for about 2½ hours until completion of reaction was indicated by a change in color to yellowish brown. The reaction mixture was then cooled to 20–25° and 290 g. of anhydrous $AlCl_3$ were added in four portions, keeping the temperature below 40°. The mixture was then refluxed on the steam bath for 6 hours. After cooling to room temperature, 800 g. of crushed ice were added in 100 g. portions, keeping the temperature below 50°. The mixture was then heated to 60° and again cooled to room temperature. Next, ca. 1100 cc. of 40% NaOH were added dropwise to pH 11, keeping the temperature below 50°. After the addition of all the alkali, the mixture was refluxed on the steam bath for 5 hours. The benzene phase was separated and the aqueous phase was extracted with three 250 cc. portions of benzene. The combined benzene solutions were concentrated in vacuo and the oily residue was refluxed for 20 hours with a mixture of 150 cc. of 40% NaOH, 150 cc. of water and 300 cc. of alcohol. The alcohol was distilled off at atmospheric pressure and the aqueous residue was cooled to room temperature. 100 cc. water were then added dropwise, precipitating 2-aminobenzophenone. The yellow product was filtered off, washed with cold water and sucked dry, M.P. 103–105°.

30 g. (0.15 mole) of 2-aminobenzophenone and 40 g. of sodium thiocyanate were suspended in 100 cc. of methanol. After cooling to 0°, a cold solution of 9.5 cc. of bromine (28.5 g.=0.36 mole) dissolved in 35 cc. cold methanol (saturated with sodium bromide) was added dropwise. After completing the addition, the reaction mixture was stirred in the cold for an additional ½ hour and poured into 1 liter of cold water. After neutralization with 110 cc. of 20% $Na_2CO_3$, the product, 2-amino-5-thiocyanobenzophenone, was filtered off and crystallized from dilute ethanol in yellow plates, M.P. 83–84°.

39 g. (0.15 mole) of 2-amino-5-thiocyanobenzophenone were suspended in 200 cc. of ethanol. The mixture was heated to 50° on the steam bath and a total of 55 g. of sodium hydrosulfite and 250 cc. of 10% NaOH were added alternately in portions. The temperature was raised to 80°. At this point the reaction mixture gave a blue coloration with indanthrene yellow paper, indicating the presence of an excess of $Na_2S_2O_4$.

After cooling to 40°, 20 cc. (27 g.=0.22 mole) of dimethylsulfate were added dropwise. A negative reaction with lead acetate at this point indicated the absence of free mercaptan. It was stirred for 1 hour at room temperature and then the ethanol was distilled off. The aqueous phase was diluted with 700 cc. of water and the oily thioether was extracted with four 300 cc. portions of benzene. The benzene phase was dried and the solvent removed by vacuum distillation. The crude reaction product, 2-amino-5-methylmercaptobenzophenone, remained as a heavy oil.

78 g. (0.32 mole) of 2-amino-5-methylmercaptobenzophenone was refluxed overnight with 37 g. (0.53 mole) of hydroxylamine hydrochloride in 400 cc. of alcohol. After evaporating to dryness in vacuo, the residue was taken up in 125 cc. of water. Careful addition of 40 cc. of 40% NaOH+5 cc. of 20% $Na_2CO_3$, followed by 20 cc. of glacial acetic acid made the mixture slightly acid to litmus. 125 cc. of ether and 125 cc. of Skellysolve B were then added and the mixture was stored in the refrigerator overnight. The supernatant liquid was decanted and the gummy precipitate was dissolved in 500 cc. of ether. After washing with water, the ether solution was dried over sodium sulfate. It was then concentrated in vacuo to an oil which, on treatment with 200 cc. of ether and 100 cc. of Skellysolve B, yielded crystaline 2-amino-5-methylmercaptobenzophenone oxime. The pure oxime crystallized in yellow needles from dilute ethanol and melted at 149–150°.

15.5 g. (0.06 mole) of 2-amino-5-methylmercaptobenzophenone oxime was dissolved in 150 cc. of glacial acetic acid at 40°. 9.5 cc (14 g.=0.125 mole) of chloroacetyl chloride was added at 55–60°. The reaction mixture was stirred at 50–60° for ½ hour and then at room temperature for 4 hours. The solution was concentrated in vacuo and the resulting oily residue was dissolved in 150 cc. of boiling methylene chloride. The solution was cooled and diluted with about 150 g. of crushed ice. 1 N NaOH was added with stirring until the mixture was alkaline to phenolphthalein. The methylene chloride phase was separated and dried over sodium sulfate. Concentration of the methylene chloride solution to incipient crystallization gave the product, 6-methylmercapto-2-chloromethyl-4-phenylquinazoline 3-oxide. The pure substance crystallized from methylene chloride in yellow needles, M.P. 155–156°.

To a suspension of 3.2 g. (0.01 mole) of 6-methylmercapto-2-chloromethyl-4-phenylquinazoline 3-oxide in 20 cc. ethanol, there was added dropwise 12 cc. (0.012 mole) of 1 N NaOH. The mixture was warmed to 45° and then cooled to 25°. 10 cc. of acetone was added and the reaction mixture was stirred for 3 hours, then left at room temperature for 15 hours. The mixture was cooled in ice, the precipitate was filtered off, washed with a small amount of cold ethanol and dried. The pure product, 7 - methylmercapto-5-phenyl-3H-1,4-benzodiazepin-2 (1H)-one-4-oxide, crystallized in needles from water (containing a few drops of alcohol), M.P. 191–193°.

*Example 30*

A solution of 2.0 g. of 3-acetoxy-2-methylamino-7-nitro-5-phenyl-3H-1,4-benzodiazepine in 100 ml. of ethanol containing 5 ml. of 22% hydrochloric acid in ethanol was heated to reflux for 5 minutes. After concentration to a small volume in vacuo, the residue was partitioned between chloroform and dilute sodium carbonate. The organic layer was washed with water, dried over sodium sulfate, filtered and the solvent distilled off in vacuo. The residue was recrystallized from a mixture of acetone and hexane to give yellow prisms of 3-ethoxy-2 - methylamino-7-nitro-5-phenyl-3H-1,4-benzodiazepine. Recrystallization from a mixture of tetrahydrofuran and hexane gave a purified product melting at 222–223°.

*Example 31*

A suspension of 398 g. of 7-chloro-1-methyl-5-phenyl-3H-1,4-benzodiazepin-2(1H)-one 4-oxide in 2 l. acetic anhydride was heated and stirred on the steam bath for 45 minutes. The reaction mixture was cooled to about 10° and the reaction product, 3-acetoxy-7-chloro-1-methyl-5-phenyl-3H-1,4-benzodiazepin-2(1H)-one, melting at 263–5° was separated by filtration.

*Example 32*

To a stirred suspension of 204 g. of 3-acetoxy-7-chloro-1,3 - dihydro - 1-methyl-5-phenyl-2H-1,4-benzodiazepin-2- one in 4.5 l. dioxane was added 60 ml. of concentrated hydrochloric acid. The reaction mixture was stirred at room temperature for 17 hours and the crystalline crude reaction product was separated by filtration. This product was suspended in 300 ml. of methylene chloride and treated with 200 g. of ice and 200 ml. of water. The mixture was then stirred until the product was completely dissolved in the methylene chloride. The organic layer was separated and the aqueous part extracted once more with methylene chloride. The organic layers were combined, dried over sodium sulfate, filtered and the filtrate concentrated in vacuo to dryness. The residue was crystallized from ether or a mixture of methylene chloride, ether and petroleum ether, and yielded 7-chloro-1,3 - dihydro-3-hydroxy-1-methyl-5-phenyl-2H-1,4-benzodiazepin-2-one. It was best recrystallized from large amounts of ether. The product is dimorphic. When crystallized from cyclohexane at 50° prisms are obtained melting at 115–16°. Crystallized from ether the product forms needles melting at 120–2°.

*Example 33*

A solution of 1.5 g. of 7-chloro-1,3-dihydro-3-hydroxy-1 - methyl - 5 - phenyl - 2H 1,4 - benzodiazepin - 2 - one in 40 ml. of warm dioxane was cooled in an ice bath and treated with 0.5 ml. of concentrated hydrochloric acid. An oily precipitate was formed which crystallized upon standing at room temperature. The purified crystals of 7 - chloro - 1,3 - dihydro - 3 - hydroxy - 1 - methyl - 5-phenyl-2H-1,4-benzodiazepin-2-one hydrochloride were separated by filtration and melted at 153–5°.

*Example 34*

A solution of 0.9 g. of 7chloro-1,3-dihydro-3-hydroxy-1-methyl - 5 - phenyl - 2H - 1,4 - benzodiazepin - 2 - one hydrochloride in 50 ml. of ethanol was refluxed for 1 hour. The reaction mixture was concentrated in vacuo to a smaller volume and the product, 7-chloro-3-ethoxy-1,3-dihydro - 1 - methyl - 5 - phenyl - 2H - 1,4 - benzodiazepin-2-one, melting at 240–2° was separated by filtration.

*Example 35*

A stirred suspension of 6.8 g. of 3-acetoxy-7-chloro-1-methyl - 5 - phenyl - 1,3 - dihydro - 2H - 1,4 - benzodiazepin-2-one in a mixture of 600 ml. of ethanol and 20 ml. of 1 N hydrochloric acid was heated on a steam bath for 20 minutes. The clear solution thus obtained was then stirred at room temperature for 30 minutes, concentrated in vacuo to a small volume and the precipitated crystalline reaction product, 7-chloro-3-ethoxy-1,3-dihydro-1-methyl-5-phenyl-2H-1,4-benzodiazepin-2-one, was separated by filtration. After recrystallization from a mixture of methylene chloride and ether the purified product formed colorless plates melting at 240–242°.

*Example 36*

A solution of 8.1 g. of 7-chloro-1,3-dihydro-3-hydroxy-1 - methyl - 5 - phenyl - 2H - 1,4 - benzodiazepin - 2 - one hydrochloride in 250 ml. of methanol was refluxed for 1 hour. The reaction mixture was concentrated in vacuo to dryness and the residue was dissolved in a mixture of methylene chloride and water. The organic layer was separated, dried and concentrated in vacuo to dryness. The residue was crystallized from ether and yielded 7-chloro - 1,3 - dihydro - 3 - methoxy - 1 - methyl - 5-phenyl - 2H - 1,4 - benzodiazepin - 2 - one. After recrystallization from ether the purified product formed colorless prisms melting at 146–7°.

*Example 37*

To a solution of 4.2 g. of 3-acetoxy-7-methylthio - 5 - phenyl - 2H - 1,4 - benzodiazepin - 2-one in 250 ml. of tetrahydrofuran, 13 ml. of 2 N hydrochloric acid was used. After standing overnight at room temperature, the solution was concentrated to a small volume in vacuo. The residue was then partitioned between chloroform and water. The organic layer was washed with dilute sodium carbonate and water, dried over sodium sulfate, and concentrated to dryness in vacuo. The residue, when heated with acetone, crystallized. Recrystallization from a mixture of tetrahydrofuran and hexane gave 1,3 - dihydro - 3 - hydroxy - 7 - methylthio - 5-phenyl-2H-1,4-benzodiazepin-2-one melting at 200–201° dec. (clusters of needles). Further crystallization did not alter the melting point.

*Example 38*

A solution of 3.2 g. of 1,3-dihydro-1-methyl-5-phenyl-7-trifluoromethyl - 2H - 1,4 - benzodiazepin - 2 - one 4-oxide in 35 ml. of acetic anhydride was heated for 1 hour on a steam bath. Excess acetic anhydride was then distilled off in vacuo. The residue was then crystallized from a mixture of acetone and hexane to give 3-acetoxy-1,3-dihydro - 1 - methyl - 5 - phenyl - 7 - trifluoromethyl - 2H-1,4-benzodiazepin-2-one melting at 189–190.5°. Further crystallization did not alter the melting point.

The above-mentioned 1,3-dihydro-1-methyl-5-phenyl-7-trifluoromethyl-2H-1,4-benzodiazepin-2-one 4-oxide and its preparation are not a part of this invention, but such are disclosed hereinbelow in order that this disclosure may be complete.

1.60 g. of 7-trifluoromethyl-5-phenyl-3H-1,4-benzodiazepin-2(1H)-one 4-oxide were dissolved in 60 ml. of benzene, containing 0.30 g. of sodium methoxide. After the addition of a solution of 0.50 ml. of dimethylsulfate in 20 ml. of benzene, the reaction mixture was refluxed for 1 hour, then cooled. The organic layer was separated, washed with water and dried over sodium sulfate. Evaporation of the solvent in vacuo yielded an amorphous crude, which was crystallized from ether-hexane to give pure 1 - methyl - 7 - trifluoromethyl - 5 - phenyl - 3H-1,4-benzodiazepin-2(1H)-one 4-oxide, in the form of small prisms, M.P. 177–180°, which upon recrystallization melted at 184–186° (corr.).

*Example 39*

To a solution of 6.7 g. of 3-acetoxy-1,3-dihydro-1-methyl - 5 - phenyl - 7 - trifluoromethyl - 2H - 1,4-benzodiazepin-2-one in 200 ml. of tetrahydrofuran, 17.8 ml. of 2 N hydrochloric acid was added. After standing overnight at room temperature, solvent was removed by distillation in vacuo. The residue was partitioned between chloroform and water. The chloroform layer was then washed with dilute sodium carbonate, then water and dried over sodium sulfate. After filtration, chloroform was distilled off in vacuo. Crystallization of the residue from a mixture of acetone and hexane gave clusters of colorless plates of 1,3-dihydro-3-hydroxy-1-methyl-5-phenyl-7-trifluoromethyl - 2H - 1,4 - benzodiazepin - 2 - one. Recrystallization from the same solvent pair gave product melting at 184–185°.

We claim:

1. A method for the preparation of a compound selected from the group consisting of compounds of the formula

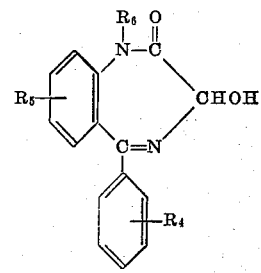

wherein $R_4$ is selected from the group consisting of hydrogen, halogen and trifluoromethyl; $R_5$ is selected from the group consisting of hydrogen, halogen, trifluoromethyl, nitro lower alkylthio and lower alkyl; and $R_6$ is selected from the group consisting of hydrogen, lower alkyl and lower alkenyl, which comprises acid hydrolysis of a compound selected from the group consisting of compounds of the formula

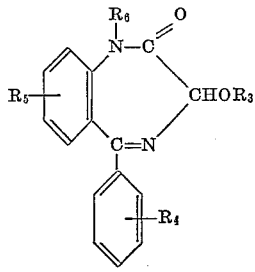

wherein $R_4$, $R_5$ and $R_6$ have the same meaning as above and $R_3$ is selected from the group consisting of lower alkanoyl, and benzoyl.

2. A process for the preparation of 7-halo-1,3-dihydro-3 - hydroxy - 1 - lower alkyl - 5 - phenyl - 2H - 1,4-benzodiazepin-2-one which comprises treating 7-halo-1,3-dihydro - 3 - lower alkanoyloxy - 1 - lower alkyl - 5-phenyl-2H-1,4-benzodiazepin-2-one with aqueous mineral acid.

3. A process for the preparation of 7-halo-1,3-dihydro-3 - hydroxy - 5 - phenyl - 2H - 1,4 - benzodiazepin - 2-one which comprises treating 7-halo-1,3-dihydro-3-lower alkanoyloxy - 5 - phenyl - 2H - 1,4 - benzodiazepin - 2-one with aqueous mineral acid.

4. A process for the preparation of a compound selected from the group consisting of compounds of the formula

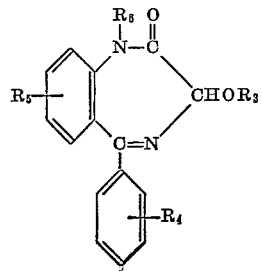

wherein $R_3$ is lower alkyl; $R_4$ is selected from the group consisting of hydrogen, halogen and trifluoromethyl; $R_5$ is selected from the group consisting of hydrogen, halogen, trifluoromethyl, nitro, lower alkylthio and lower alkyl; and $R_6$ is selected from the group consisting of hydrogen, lower alkyl and lower alkenyl, which comprises treating corresponding benzodiazepine compounds wherein $R_3$ is selected from the group consisting of hydrogen, lower alkanoyl, and benzoyl with lower alkanol.

5. A process as in claim 4 wherein the lower alkanol treatment is conducted in the presence of acid.

6. A process as in claim 4 wherein the benzodiazepine being treated is in the form of its acid addition salt.

7. A process for the preparation of 7-chloro-1,3-dihydro - 3 - hydroxy - 5 - phenyl - 2H - 1,4 - benzodiazepin-2-one which comprises treating 7-chloro-1,3-dihydro-3-lower alkanoyloxy-5-phenyl-2H-1,4-benzodiazepin-2-one with aqueous mineral acid.

8. A process as in claim 7 wherein the aqueous mineral acid is hydrochloric acid.

References Cited
UNITED STATES PATENTS
3,120,521    2/1964    Sternbach et al. _____ 260—239

OTHER REFERENCES
Groggins: Unit Processes in Organic Synthesis, (New York, 1947, pp. 669–675.

South African Patent Journal, Wednesday, June 21, 1961, page 30.

ALTON D. ROLLINS, *Primary Examiner.*

N. S. RIZZO, W. A. MODANCE, *Examiners.*

J. T. MILLER, *Assistant Examiner.*

UNITED STATES PATENT OFFICE
CERTIFICATE OF CORRECTION

Patent No. 3,340,253                                   September 5, 1967

Earl Reeder et al.

It is hereby certified that error appears in the above numbered patent requiring correction and that the said Letters Patent should read as corrected below.

Column 1, lines 21 to 33, for that portion of the formula reading "$R_2-$" read -- $R_5-$ --; lines 35 to 46, for that portion of the formula reading

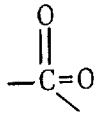     read     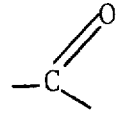

column 6, line 26, for "an" read -- and --; column 7, line 1, for "$C_{19}H_{16}F_3O_2HCl$" read -- $C_{19}H_{16}F_3N_3O_2HCl$ --; line 18, for "such as" read -- such are --; column 9, line 35, for "I" read -- 1 --; column 12, line 32, for "pheny-" read -- phenyl- --; column 13, line 35, for "100 cc." read -- 1000 cc. --; column 15, line 24, for "2H 1,4-" read -- 2H-1,4- --; line 74, for "was used." read -- was added. --.

Signed and sealed this 17th day of December 1968.

(SEAL)
Attest:

EDWARD M. FLETCHER, JR.
Attesting Officer

EDWARD J. BRENNER
Commissioner of Patents